United States Patent [19]

Destryker et al.

[11] Patent Number: 5,066,706
[45] Date of Patent: Nov. 19, 1991

[54] PROCESS FOR PREPARING A LATEX BASED ON POLYPYRROLE AND USE OF THIS LATEX TO FORM A CONDUCTING FILM

[75] Inventors: Elise Destryker, Sint-Pieters-Leeuw; Etienne Hannecart, Tervueren, both of Belgium

[73] Assignee: Solvay & Cie (Société Anonyme), Brussels, Belgium

[21] Appl. No.: 319,314

[22] Filed: Mar. 6, 1989

[30] Foreign Application Priority Data

Mar. 21, 1988 [FR] France .................. 88 03778

[51] Int. Cl.$^5$ .......................... C08F 2/16
[52] U.S. Cl. ...................... 524/459; 524/745; 524/808
[58] Field of Search .......... 524/808, 156, 435, 459, 524/745; 526/94, 93; 252/500, 518, 519

[56] References Cited

U.S. PATENT DOCUMENTS 4,697,001  9/1987  Walker et al. ............. 252/500
4,847,115  7/1989  Warren et al. ............. 252/519

FOREIGN PATENT DOCUMENTS 0229992   7/1987  European Pat. Off. .
3318856  11/1984  Fed. Rep. of Germany .
2181367   4/1987  United Kingdom .

OTHER PUBLICATIONS

Journal of Colloid and Interface Science; vol. 118, No. 2.
Makromolekulare Chemie, Rapid Communications; vol. 5, No. 3, 3/1984; pp. 157–164.

*Primary Examiner*—Joseph L. Schofer
*Assistant Examiner*—R. H. Delmendo
*Attorney, Agent, or Firm*—Spencer & Frank

[57] ABSTRACT

Process for preparing a latex of polypyrrole in an aqueous reagent medium containing a ferric salt, a hydrolyzed polyvinyl acetate and a dodecyl sulphate.

The films prepared with this conducting latex are homogeneous, adhere to metals and metallized glasses and have high conductivity.

16 Claims, No Drawings

PROCESS FOR PREPARING A LATEX BASED ON POLYPYRROLE AND USE OF THIS LATEX TO FORM A CONDUCTING FILM

BACKGROUND OF THE INVENTION

1. Field of the Background

The invention relates to a process for preparing a latex based on polypyrrole, from which it is possible to obtain adherent homogeneous films in a wide range of thickness and having high conductivity.

2. Discussion of the Background

It has already been proposed, in British Patent Application 2,181,367, to prepare conducting films based on pyrrole by polymerizing pyrrole in an aqueous medium in the presence of a polyvinyl alcohol and a substance capable of providing the property of conductivity, such as a ferric compound or a persulphate.

Similarly, it has been proposed—in the document Journal of Colloid and Interface Science, Vol. 118, No. 2, August 1987, p. 410–416—to prepare a water-stable latex based on polypyrrole by employing a technique of polymerization of pyrrole involving ferric chloride as an initiator and a partially hydrolized polyvinyl acetate as a stabiliser.

However, these processes lead to polymers having low conductivity. The films obtained with these polymers are, in general, poorly homogeneous or adhere only weakly to metals, glasses and metallized glasses.

SUMMARY OF THE INVENTION

The object of the present invention is to provide a process which no longer has these drawbacks.

To this end, the invention relates to a process for preparing a latex based on polymers of pyrrole or of a pyrrole derivative in an aqueous reaction medium comprising a ferric salt, a polyvinyl alcohol or a derivative of this alcohol and a codispersant agent.

DETAILED DESCRIPTION OF THE PREFERRED EMBODIMENT

Codispersant agent is understood to mean organic compounds capable of giving rise to anions. Among these compounds, organic compounds which react with the ferric salt present in the reaction medium, or which have already reacted with a ferric salt before introduction into the reaction medium, are preferred. In general, alkyl or aryl sulphates or sulphonates, acids such as benzoic acid, ammonium salts or alkali metal salts such as ammonium or sodium laurate, trichloroacetate, phenylphosphonate or (glycerol 2-phosphate) are employed.

Compounds chosen from the following are usually employed:

benzoic, para- and meta-hydroxybenzoic, trifluoromethanesulphonic, benzenesulphonic, para-toluene sulphonic and dodecylbenzenesulphonic acids;

salts such as sodium salts of trifluoromethanesulphonic, lauric, trichloroacetic, phenylphosphonic, glycerol-2-phosphonic, octylsulphonic, pentadecylsulphonic, hexadecyl-sulphonic, polyvinylsulphonic, polystyrenesulphonic, para-toluenesulphonic, dodecylbenzenesulphonic, para-hydroxy benzenesulphonic, 4-dimenthylaminobenzenesulphonic, 1,3-benzene-disulphonic and dodecyl sulphuric acids.

Preferably, compounds containing a dodecyl sulphuric sulphate group are employed. It is especially preferable to employ sodium dodecyl sulphate.

In the reaction medium, a polyvinyl alcohol or a derivative of this alchol such as, in particular, an acetate is employed also, as a dispersant agent. A hydrolysed polyvinyl acetate is usually employed, and preferably a hydrolysed polyvinyl acetate having a degree of hydrolysis of between 72 and 96% and an average molecular weight of between 50,000 and 200,000. Good results have been obtained with a hydrolysed polyvinyl acetate having a degree of hydrolysis of between 86 and 90% and an average molecular weight of between 100,000 and 140,000.

In the reaction medium, a ferric salt is employed also, as an oxidizing and doping agent, causing polymerization. In general, an organic or inorganic ferric salt is employed. Usually, a chloride, sulphate or nitrate is employed as an inorganic ferric salt, and compounds of the following type are employed as an organic ferric salt: iron trichloroacetate, iron phenylphosphonate, iron (glycerol 2-phosphate), iron pentadecylsulphonate, iron hexadecylsulphonate, iron polyvinylsulphonate, iron polystyrenesulphonate, iron dodecylbenzenesulphonate, iron tosylate, iron trifluoromethanesulphonate and iron dodecyl sulphate. Preferably, ferric chloride is employed.

Finally, the reaction medium contains a pyrrole derivative, which is understood to mean pyrrole, N-methylpyrrole, pyrroles substituted at the 3-position and mixtures of these compounds. Preferably, unsubstituted pyrrole is employed.

The quantity of codispersant agent employed in the process according to the invention can vary according to its chemical nature.

When sodium dodecyl sulphate is used, 0.01 to 7.5 moles per mole of pyrrole monomer, usually 0.05 to 3 moles and preferably 0.1 to 2 moles, are generally employed. Good results have been obtained with concentrations of between 0.3 and 1 moles of sodium dodecyl sulphate per mole of pyrrole monomer.

The quantity of polyvinyl alcohol, or of the derivative of this alcohol, employed can vary within wide limits, and depends on its solubility in water. When a hyydrolysed polyvinyl acetate is used, 0.1 to 8 g per gram, of pyrrole monomer, and usually 0.2 to 5 g are generally employed. Good results have been obtained with concentrations of between 0.3 and 2 g of hydrolysed polyvinyl acetate per gram pyrrole monomer.

In order for the process to show a good yield, the quantity of ferric salt to be employed is large. When ferric chloride is used, 0.3 to 3 moles of ferric chloride are generally employed per mole of pyrrole. Good results have been obtained with concentrations of between 2 and 2.7 moles of ferric chloride per mole of pyrrole.

The process according to the invention is preferably performed in an aqueous medium, but the quantity of water needed can vary within wide limits, and depends chiefly on the other components.

The process according to the invention can advantageously be carried out according to the following stages:

in a first stage, water, the ferric salt, the polyvinyl alcohol or the derivative of this alcohol and the codispersant agent are introduced into the reactor to form the reaction medium;

in a second stage, pyrrole or the pyrrole derivative is added with stirring to this reaction medium in the presence of water.

The latex finally obtained after these two stages is concentrated by centrifugation or ultrafiltration or by any known method. It is then washed with water. The concentrated latex is washed and then redispersed in an aqueous solution of polyvinyl alcohol or of a derivative of this alcohol. This aqueous solution usually contains from 0.1 to 50 g of polyvinyl alcohol or of the derivative of this alcohol per 100 ml of water, and preferably from 0.5 to 10 g. In general, the chemical compound already used in the first stage is employed.

The temperature at which the process is carried out is generally between 0° and 50° C., and preferably between 5° and 40° C., when working at atmospheric pressure.

The pressure at which the process is carried out is not in itself critical. It is generally between 0.1 and 10 bar, and is preferably equal to atmospheric pressure.

The process according to the invention can be carried out in any apparatus or any reactor permitting the combination of the working conditions described above.

EXAMPLES

The invention is illustrated by the examples which follow.

COMPARATIVE EXAMPLES 1R, 2R, 3R AND 4R 150 ml of water, ferric chloride ($FeCl_3.6\ H_2O$) and polyvinyl acetate, 88% hydrolysed and of average moleecular weight 120,000, are introduced into a 500-ml round-bottomed flask; the quantities of these products are noted in Table 1.

To the reaction medium thereby obtained, pyrrole, dissolved in 50 ml of water, is added dropwise and with stirring.

The flask is maintained for 2 hours at 20° C. The product obtained is spread on metallized glass (ITO glass) and on nickel, and then dried at room temperature overnight.

After this drying, the film obtained is washed with ethanol one or more times until the ethanol is clear.

The characteristics of the films obtained are collated in Table 1: the films obtained are poorly homogeneous and have low adhesion, and their conductivity is low.

TABLE 1

| | Products employed | | | Characteristics of the films obtained | | | | |
|---|---|---|---|---|---|---|---|---|
| | | Hydrolysed | | | | | | |
| Example No. | $FeCl_3.6H_2O$ (g) | polyvinyl acetate (g) | Pyrrole (g) | Homogeneity | Adhesion* to ITO glass | to nickel | Thickness obtained after only 1 spreading ($\mu$m) | Conductivity ($S \cdot cm^{-1}$) |
| 1R | 29.7 | 1 | 3 | very poor | 2A | 2A | 50 | $10^{-2}$ to 1 |
| 2R | 17.2 | 1.2 | 1.6 | very poor | 2A | 2A | 6 | 0.3 |
| 3R | 32.1 | 2.25 | 3 | poor | 2A | 2A | 75 | $10^{-1}$ |
| 4R | 95.1 | 6.75 | 9 | poor | 2A | 2A | 100 | $3 \times 10^{-3}$ |

*The adhesion is measured according to ASTM standard D 3359-78A, which employs a test with 3M Scotch tape no. 710 (American National Standard).

The present invention also relates to the use of the latex obtained to form a conducting film. In effect, the process according to the invention makes it possible to obtain stable latices, composed of conducting polymers, capable of forming adherent, homogeneous and highly conductive films in a wide range of thickness.

The films obtained are homogeneous and, as a result, do not laminate spontaneously. It is hence possible to obtain very thin layers such as, in particular, submicronic layers, films of 0.2 to several tens of microns, but also layers of several hundred microns.

The conducting polymers obtained can, in particular, be used as active or passive electrode materials, a binding agent in electrodes, electromagnetic screening, components of batteries, accumulators or capacitors, electrochemical and electrochromic devices, paints for electromagnetic absorption and also, depending on the thickness of the films obtained, for display, for data recording and as materials for electronic components and circuits.

The latices obtained according to the invention can be deposited on any support such as, in particular, glass, metals, metallized glasses, glass fibres, textiles plastics.

COMPARATIVE EXAMPLES 5R AND 6R 150 ml of water, 29.7 g of ferric chloride $FeCl_3.6\ H_2O$ and 1 g of polyvinyl acetate, 88% hydrolysed and of average molecular weight 120,000, are introduced into a 500-ml round-bottomed flask, and 3 g of pyrrole, dissolved in 50 ml of water, are then added dropwise and with stirring.

The flask is maintained for 2 hours at 20° C. The product obtained is centrifuged for 30 minutes at 15,000 rpm and washed twice with water.

It is then dispersed
either in a solution of 2 g of 88% hydrolysed polyvinyl acetate in 100 ml of water (ex. 5R);
or in a solution of 5.6 g of 88% hydrolysed polyvinyl acetate in 200 ml of water (ex. 6R).

The product obtained is spread on metallized glass (ITO glass) and on nickel and then dried at room temperature overnight.

The characteristics of the films obtained are collated in Table 2.

The films obtained show low conductivity.

TABLE 2

| Example No. | Homogeneity | Adhesion* on ITO glass | on nickel | Thickness obtained after only 1 spreading ($\mu$m) | Conductivity ($S \cdot cm^{-1}$) |
|---|---|---|---|---|---|
| 5R | good | 4A | 4A | 50-100 | 0.09 |
| 6R | good | 4A | 4A | 80 | $10^{-4}$ |

*The adhesion is measured according to ASTM Standard D 3359-78A, which employs a test with 3M Scotch tape No. 710 (American National Standard)

EXAMPLES 7 and 8

150 ml of water, 29.7 g of ferric chloride $FeCl_3.6 H_2O$, 4 g of polyvinyl acetate, 88% hydrolysed and of average molecular weight 120,000, and 6.3 g of sodium dodecyl sulphate are introduced into a 500-ml round-bottomed flask.

3 g of pyrrole, dissolved in 50 ml of water, are then added dropwise and with stirring.

The flask is maintained for 2 hours at 20° C.

The latex obtained is centrifuged for 30 minutes at 15,000 rpm and washed twice with water.

It is then dispersed in a solution of 2 g of 88% hydrolysed polyvinyl acetate in 100 ml of water for Example 7, and 2 g of 88% hydrolysed polyvinyl acetate in 300 ml of water for Example 8.

The latex obtained is spread on metallized glass (ITO glass) and on nickel, and then dried at room temperature overnight.

The characteristics of the films obtained are collated in Table 3: the films obtained have high conductivity and good adhesion.

TABLE 3

| Example No. | Homogeneity | Adhesion* to ITO to glass | to nickel | Thickness obtained after only 1 spreading (μm) | Conductivity $(S \cdot cm^{-1})$ |
|---|---|---|---|---|---|
| 7 | good | 4A | 4A | 50-100 | 10 |
| 8 | good | 4A | 4A | 10 | 12 |

*The adhesion is measured according to ASTM Standard D 3359-78A, which employs a test with 3M Scotch tape No. 710 (American National Standard).

We claim:

1. A process for preparing a latex based on pyrrole or a pyrrole derivative, the latex forming an electrically conductive film upon drying, comprising the following operations:
   1) in a first stage, water a ferric salt, a polyvinyl alcohol or derivative of this alcohol and a codispersant agent are introduced into a reactor, to form a reaction medium, wherein said codispersant is an organic compound capable of giving rise to anions selected from the group consisting of alkyl sulphates, aryl sulphates, alkyl sulphonates and aryl sulphonates, and
   2) in a second stage, pyrrole or the pyrrole derivative is added to the reaction medium in the presence of water.

2. Process according to claim 1, wherein the latex obtained is concentrated, then washed with water and then redispersed in an aqueous solution of polyvinyl alcohol or of a derivative of this alcohol.

3. Process according to claim 1, wherein the codispersant agent employed is sodium dodecyl sulphate.

4. Process according to claim 3, wherein sodium dodecyl sulphate is employed at concentrations of between 0.3 and 1 mole per mole of pyrrole derivative.

5. Process according to claim 1 wherein the polyvinyl alcohol derivative employed is a hydrolysed polyvinyl acetate.

6. Process according to claim 5, wherein the hydrolysed polyvinyl acetate is employed at concentrations of between 0.1 and 8 g per g of pyrrole.

7. Process according to claim 1 wherein the ferric salt employed is ferric chloride.

8. Process according to claim 7, wherein ferric chloride is employed at concentrations of between 2 and 2.7 moles per mole of pyrrole.

9. A process for preparing a latex based on polymers of pyrrole or a pyrrole derivative in an aqueous reaction medium comprising the sequential steps of forming a solution of water, a ferric salt, a polyvinyl alcohol or a polyvinyl alcohol derivative, and a codispersant agent, wherein said codispersant is an organic compound capable of giving rise to anions selected from the group consisting of alkyl sulphates, aryl sulphates, alkyl sulphonates and aryl sulphonates, and
   adding the pyrrole or the pyrrole derivative to the solution.

10. The process according to claim 9, wherein the codispersant agent contains a dodecyl sulphate group.

11. The process defined in claim 1, wherein the codispersant agent is an organic compound producing a dodecyl sulfate anion.

12. A process for preparing a latex based on pyrrole, the latex forming an electrically conductive film upon drying, comprising the following operations:
   1) in a first stage, water, ferric chloride, a hydrolyzed polyvinyl acetate, and sodium dodecyl sulphate are introduced into a reactor, to form a reaction medium, and
   2) in a second stage, pyrrole is added to the reaction medium in the present of water.

13. Process according to claim 12, wherein sodium dodecyl sulphate is employed at concentrations of between 0.3 and 1 mole per mole of pyrrole.

14. Process according to claim 12, wherein the hydrolyzed polyvinyl acetate is employed at concentrations of between 0.5 and 2 g per g of pyrrole.

15. Process according to claim 12, wherein ferric chloride is employed at concentrations of between 2 and 2.7 moles per mole of pyrrole.

16. Process according to claim 12, wherein the latex obtained is concentrated, then washed with water and then redispersed in an aqueous solution of polyvinyl alcohol or of a derivative of this alcohol.

* * * * *

UNITED STATES PATENT AND TRADEMARK OFFICE
CERTIFICATE OF CORRECTION

PATENT NO. : 5,066,706
DATED : November 19, 1991
INVENTOR(S) : Elise DESTRYKER et al.

It is certified that error appears in the above-identified patent and that said Letters Patent is hereby corrected as shown below:

Please correct the title on the cover page under [54] to read as follows:

-- PROCESS FOR PREPARING A LATEX BASED ON POLYPYRROLE -- .

Signed and Sealed this

Twenty-first Day of September, 1993

Attest:

BRUCE LEHMAN

Attesting Officer     Commissioner of Patents and Trademarks